M. S. HOPKINS & C. R. BARNETT.
PROCESS FOR RECOVERY OF INGREDIENTS OF OILY INKS.
APPLICATION FILED JUNE 1, 1909.
932,470.
Patented Aug. 31, 1909.
2 SHEETS—SHEET 1.
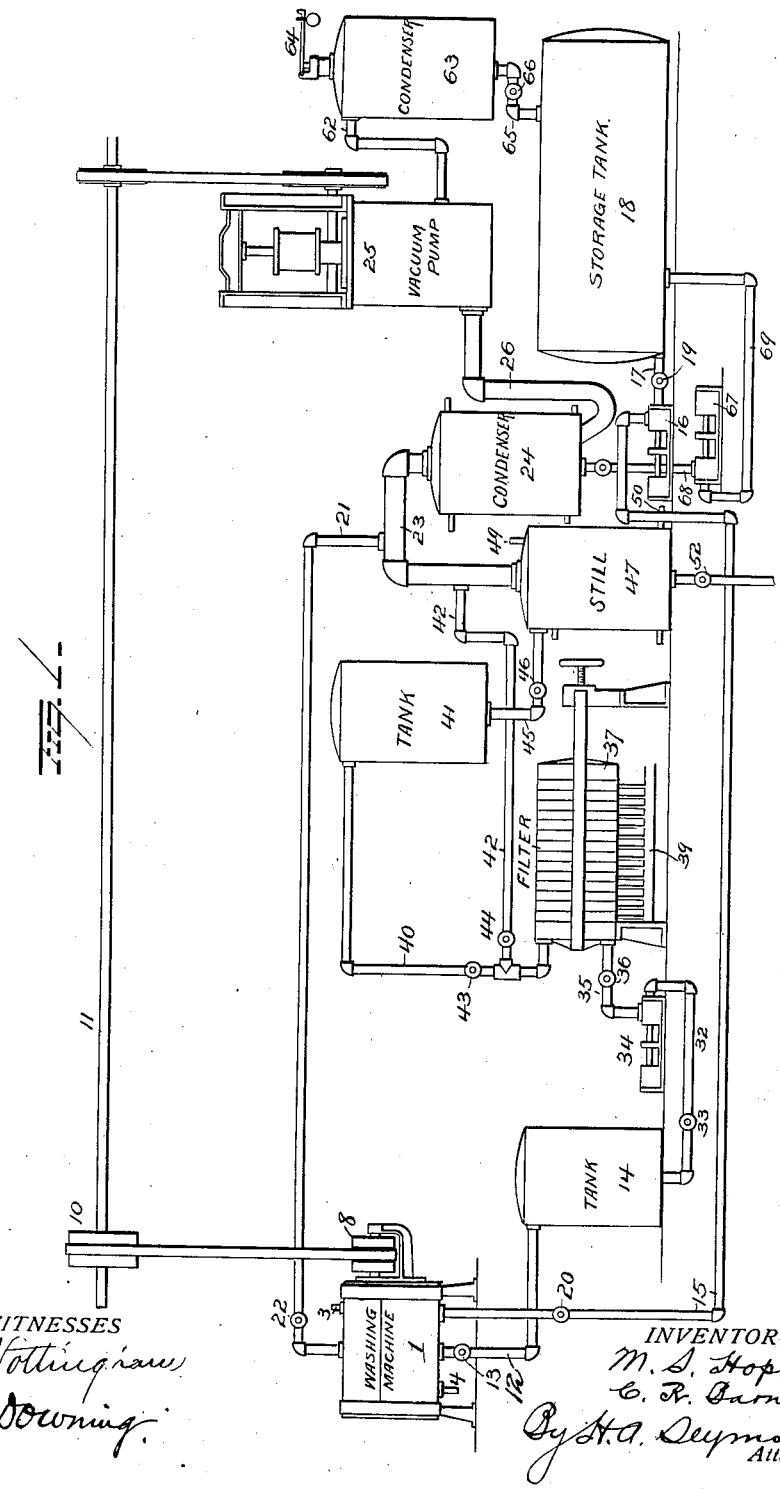
WITNESSES
E. I. Nottingham
G. F. Downing
INVENTORS
M. S. Hopkins and
C. R. Barnett
By H. A. Seymour
Attorney

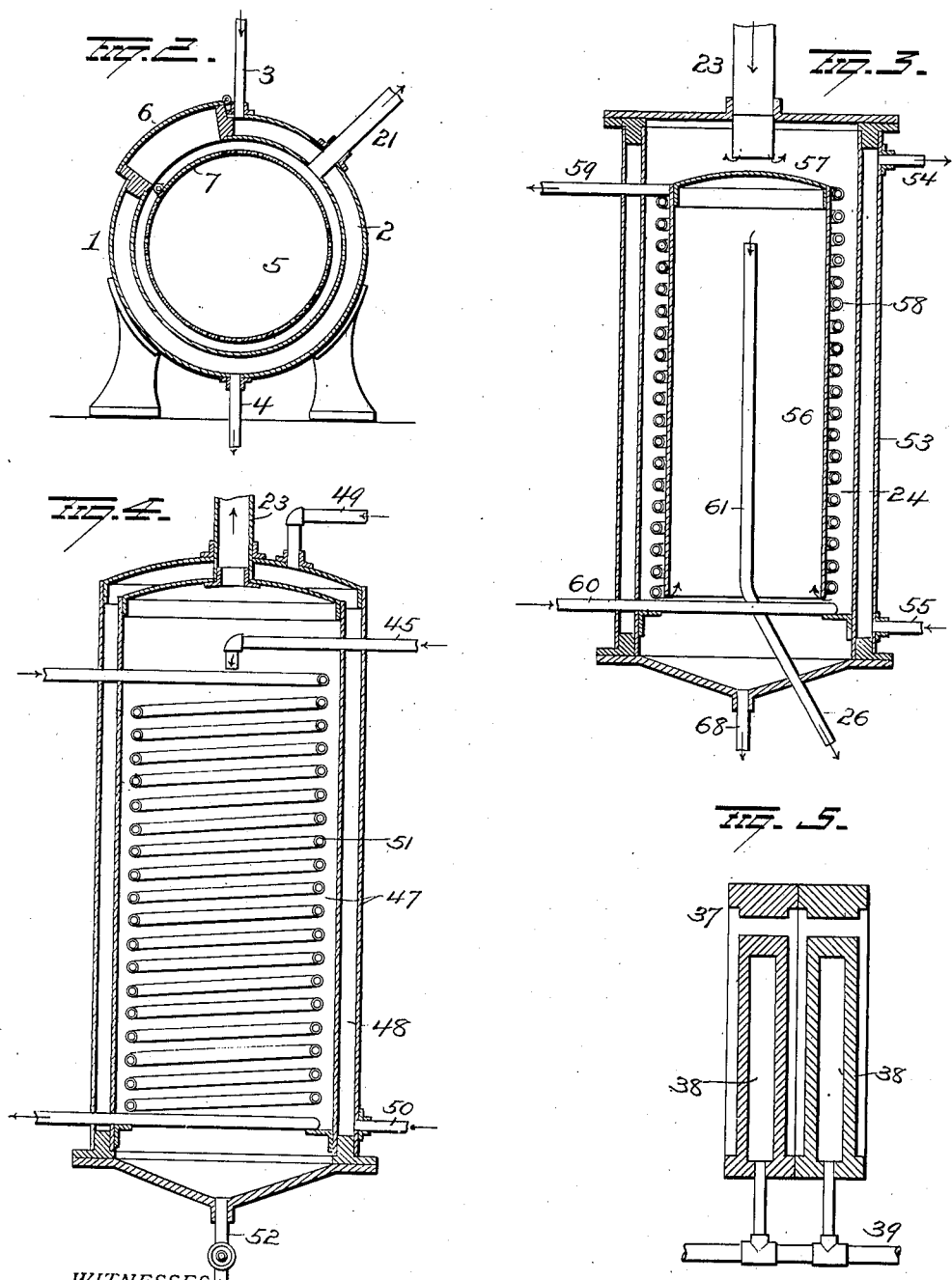

UNITED STATES PATENT OFFICE.

MATTHEW S. HOPKINS AND CHARLES R. BARNETT, OF BALTIMORE, MARYLAND.

PROCESS FOR RECOVERY OF INGREDIENTS OF OILY INKS.

932,470.  Specification of Letters Patent.  Patented Aug. 31, 1909.

Application filed June 1, 1909. Serial No. 499,433.

*To all whom it may concern:*

Be it known that we, MATTHEW S. HOPKINS and CHARLES R. BARNETT, of Baltimore city, State of Maryland, have invented certain new and useful Improvements in Processes for the Recovery of Ingredients of Oily Inks; and we do hereby declare the following to be a full, clear, and exact description of the invention, such as will enable others skilled in the art to which it appertains to make and use the same.

This invention relates to the recovery of the component ingredients of oily ink, such as that contained in the cloths used for wiping engraving plates,—the object of the invention being to so treat the ink ladened cloths that the ink will be removed therefrom and so that the resultant liquor will be in such condition that the pigment can be removed therefrom mechanically and the oil and solvent be separately recoverable as such.

With this object in view, the invention consists in certain novel steps in a process for the purpose stated, as hereinafter set forth and pointed out in the claims.

In the accompanying drawings Figure 1 is a view of any apparatus, with the use of which our improvements can be carried into effect; Fig. 2 is a sectional view of the washing machine; Fig. 3 is a sectional view of the condenser; Fig. 4 is a sectional view of the still, and Fig. 5 is a fragmentary sectional view of the filter.

It has been heretofore proposed to remove oily ink from cloths ladened with the same, with the use of solvents such as naphtha but the resultant liquor has been of comparatively little value because it has not been found to be possible to fully separate the pigment from the oil and hence the latter (which is the most valuable constituent of the liquor) could not be recovered in a sufficiently pure and uncontaminated condition as to render it commercially valuable.

We have discovered that if a solvent or washing liquid be used which will reduce the viscous quality of the oil, (which in such inks as are used on engraving plates, is a vegetable oil) the pigment will be rendered filterable from such oily vehicle. In other words, a solvent may be used for separating the ink from cloths containing the same, which will also reduce to a minimum, the affinity of the oil for the pigment and therefore these ingredients of the ink will not, in the presence of such a solvent or reagent be miscible, either mechanically or chemically. We have found that acetone is an agent possessing the qualities above mentioned of acting as a solvent for the ink to separate it from the cloths, and also acting to reduce the viscous quality of the oil and thus destroy its affinity for the pigment. The liquor consisting of the oily ink and acetone, can therefore be filtered and all of the pigment mechanically separated therefrom. The filtrate can then be distilled to separate the acetone therefrom and recover the oil freed from foreign matter and the acetone can then be condensed for further use.

In carrying our invention into effect, we place the cloths or other material containing ink or other oily pigment, in a washing machine 1 and agitate them in the presence of a material such as above described, preferably acetone.

The washing machine may consist of a body portion having a steam jacket 2 with which steam inlet and exhaust pipes 3—4 communicate, and an open-work revoluble drum 5 to contain the cloths. The body portion of the machine is provided with a door 6 and the drum is similarly provided with a door 7. One journal of the drum 5 may be provided with a pulley 8 to which motion is transmitted by a belt 9 from a pulley 10 on a line shaft 11.

After the cloths have been treated for ten minutes (more or less) with acetone or other similar solvent in the washing machine, the resulting liquor will be discharged through a pipe 12 (having a controlling valve 13) to a tank or vat 14. A pipe 15 also communicates at one end with the washing machine and at the other end with a pump 16, the latter communicating by a pipe 17 with a solvent storage tank 18. A valve 19 is provided in the pipe 17 and a similar valve 20 is provided in the pipe 15 for controlling the passage of solvent to the washing machine.

After the cloths have been treated and the liquor (consisting of solvent, pigment and oil) has been run into the tank 14 as above described, the valve 13 may be closed and the valves 19—20 opened. The pump 16 will now be operated to force more solvent into the washing machine for the further treatment of the cloths; after which the liquor will be run into the tank 14 as before. This operation may be repeated several times if necessary.

The interior of the washing machine is connected, by a pipe 21, (having a valve 22) with a pipe 23 which communicates with a condenser 24, and the latter communicates through the medium of a pipe 26 with a vacuum pump 25 as hereinafter more fully explained. The vacuum pump may be driven by belt gearing from the line shaft 11.

When the cloths have been treated with acetone solvent in the washing machine as before explained, the heat afforded by the steam jacket of the machine will serve to volatilize any solvent remaining in the cloths, and by opening the valve 22, these vapors will be drawn through the pipe 21 by the operation of the vacuum pump, and will be condensed in their passage through the condenser 24, the resulting condensed solvent finally reaching the storage tank 18, in a manner which will be explained farther on. The cloths may now be removed from the washing machine, and subjected to a washing in water if desired.

The acetone which has been used to dissolve the ink from the cloths will also act upon the oil in such manner as to reduce its viscous character and divorce the pigment therefrom, as hereinbefore explained, and therefore the liquor in the tank 14 is ready for the filter press to effect the mechanical separation and recovery of all the pigment contained in said liquor. The tank 14 is therefore connected by means of a pipe 32 having a valve 33, with a pump 34 and the latter is connected by a pipe 35 having a valve 36 with a filter press 37. The plates of this filter press are provided with chambers 38 through which steam (from a steam supply pipe 39) is circulated for heating the press. A pipe 40 connects the filter press with a tank 41, and with this pipe, one end of a pipe 42 communicates,—the other end of the pipe 42 being connected with the pipe 23 and, through the latter, with the condenser and vacuum pump. The pipe 40 is provided with a valve 43, and in the pipe 42, a valve 44 is located.

When the valves 33 and 36 are opened and the pump 34 operated the liquor containing the precipitate will be caused to flow to and through the filter press. The pigment will be arrested by the filter press, while the fluid will leave the filter press by the pipe 40 (the valve 43 being open and the valve 44 closed) and enter the tank 41. The valves 36 and 43 will now be closed and valve 44 opened. Steam will be permitted to circulate through the filter plates and supply heat which will volatilize any solvent which may remain with the pigment in the filter press. The vacuum pump 25 will be operated, and the volatilized solvent will be drawn from the filter, through the pipe 40 and, after being condensed by passage through the condenser, will find its way into the storage tank 18. Thus the pigment will be dried in the filter press and any solvent which may have remained with it will be recovered. The solution containing the heavy oil now in the tank 41, will be discharged through a pipe 45 (having a valve 46) into a still 47. This still is made with a steam jacket 48 with which steam pipes 49—50 communicate, and said still may also be provided with a steam coil 5 for supplying heat to drive off the volatile solvent contained in the fluid, and leave the only remaining ingredient of the fluid,— heavy oil,—in the bottom of the still from which it can be withdrawn through a valved discharge pipe 52.

The vaporized solvent will escape from the still through the pipe 23 to the condenser 24, and such passage of the vapor from the still will be augmented by the action of the vacuum pump 25. With the use of the vacuum pump to withdraw the vaporized solvent from the still, less heat will be required to vaporize the solvent and hence the oil which remains in the still will not be unduly darkened, as might be the case if more excessive heat were employed and the use of the vacuum pump omitted.

The condenser 24 comprises a shell having a water jacket 53 with which circulation pipes 54—55 communicate. The condenser also contains a drum 56 having its lower end open and its upper end 57 closed a short distance below the lower end of the inlet pipe 23. A water cooling coil 58 may be located in the condenser around the drum 56 and with the ends of this coil, pipes 59—60 communicate. The pipe 26 projects upwardly through the bottom of the shell of the condenser and communicates with a pipe section 61 projecting upwardly within the drum 56 and terminating near the upper closed end of the latter. Any uncondensed vapors in the condenser 24 (which has been found to be approximately one per cent.) will find exit through the pipes 61—26 to the vacuum pump, and will exhaust from the latter, through a pipe 62, to a second condenser 63. The construction of the condenser 63 may be the same as that of the condenser 24, and may, if desired, be provided with a safety valve 64. The lower end of the condenser 63 communicates with the storage tank 18, through the medium of a pipe 65 having a valve 66.

The major portion of the condensation of vaporized solvent will occur in the condenser 24, but as this condenser is in the circuit of the vacuum pump, the condensed solvent will not flow by gravity from the bottom of said condenser 24. In order, therefore, to remove the condensed solvent from the condenser 24 to the solvent storage tank 18, a pump 67 is employed. The bottom of the condenser 24 is connected, by a valved pipe 68 with the pump 67, and the latter is connected, by a pipe 69 with the solvent storage tank 18.

Having fully described our invention what we claim as new and desire to secure by Letters-Patent, is:—

1. The process consisting in washing material containing oily ink with a liquid which serves both as a solvent to separate the oily ink from the material and to render all of the pigment filterable from the oily vehicle of the ink, then filtering the liquor, thereby recovering all of the pigment and the oily vehicle, and finally separating the washing liquid from the oily vehicle.

2. The herein described process, consisting in mixing acetone with oily ink to reduce the viscosity of the oil and mechanically divorce the pigment therefrom, mechanically filtering the liquor to recover the pigment, and then treating the resulting liquid to recover the oil and acetone respectively.

3. The herein described process consisting in treating cloths containing oily ink, with acetone, mechanically filtering the resulting liquor to recover the pigment, and then recovering the oil and acetone separately.

In testimony whereof, we have signed this specification in the presence of two subscribing witnesses.

MATTHEW S. HOPKINS.
CHARLES R. BARNETT.

Witnesses:
  R. S. FERGUSON,
  E. BARNETT.